United States Patent
Clegg (10) Patent No.: US 9,238,181 B2
(45) Date of Patent: Jan. 19, 2016

(54) METHOD AND SYSTEM FOR TREATMENT OF WASTE WATER

(71) Applicant: Benjamin Clegg, Logan, UT (US)

(72) Inventor: Benjamin Clegg, Logan, UT (US)

(*) Notice: Subject to any disclaimer, the term of this patent is extended or adjusted under 35 U.S.C. 154(b) by 127 days.

(21) Appl. No.: 13/968,082

(22) Filed: Aug. 15, 2013

(65) Prior Publication Data

US 2014/0166467 A1   Jun. 19, 2014

Related U.S. Application Data

(60) Provisional application No. 61/683,468, filed on Aug. 15, 2012.

(51) Int. Cl.
| | |
|---|---|
| *B01D 1/14* | (2006.01) |
| *C02F 1/04* | (2006.01) |
| *C02F 1/06* | (2006.01) |
| *B01D 1/00* | (2006.01) |

(52) U.S. Cl.
CPC ............... *B01D 1/14* (2013.01); *B01D 1/0058* (2013.01); *C02F 1/04* (2013.01); *C02F 1/048* (2013.01); *C02F 1/06* (2013.01)

(58) Field of Classification Search
None
See application file for complete search history.

(56) References Cited

U.S. PATENT DOCUMENTS

| | | | | | |
|---|---|---|---|---|---|
| 1,830,174 | A | * | 11/1931 | Peebles | 159/4.01 |
| 3,622,511 | A | * | 11/1971 | Pizzo et al. | 210/754 |
| 3,870,585 | A | * | 3/1975 | Kearns et al. | 159/4.02 |
| 3,974,021 | A | * | 8/1976 | Bernadiner et al. | 159/4.02 |
| 5,082,525 | A | * | 1/1992 | Travis | 159/16.1 |
| 2008/0173031 | A1 | * | 7/2008 | Duesel et al. | 62/121 |
| 2010/0175983 | A1 | * | 7/2010 | Batty et al. | 203/24 |
| 2011/0303367 | A1 | * | 12/2011 | Panz et al. | 159/16.2 |

* cited by examiner

*Primary Examiner* — In Suk Bullock
*Assistant Examiner* — Jonathan Miller
(74) *Attorney, Agent, or Firm* — Thorpe North & Western, LLP (57) ABSTRACT

A method and device for reducing the volume of waste water through evaporation including a tank with a combustion pipe and burner unit, wherein water is injected into the combustion pipe, flash evaporated, and gases are projected into the tank to drive evaporative and water treatment functions.

18 Claims, 9 Drawing Sheets

METHOD AND SYSTEM FOR TREATMENT OF WASTE WATER

CLAIM OF PRIORITY

This application claims priority to U.S. Provisional Application entitled "A Water Evaporator" filed on Aug. 15, 2012 and assigned U.S. provisional application No. 61/683,468 and incorporates said application herein in its entirety by reference.

FIELD OF THE INVENTION

This invention relates generally to the field of waste-water treatment. Specifically, it relates to the concentration of waste-water produced during exploration and production activities in the oil and gas industry.

BACKGROUND OF THE INVENTION

In the oil industry, produced water is a term used to describe water that is produced along with the oil and gas. Produced water may come from various sources. For example, oil and gas reservoirs have a natural water layer that lies under the hydrocarbons. Also, water may be injected into reservoirs to help force oil to the surface. This water is produced along with the oil and/or gas when the latter is extracted. Produced water is considered an industrial waste, and therefore, careful disposal is necessary. Historically, produced water was disposed of in large evaporation ponds. However, this has become an increasingly unacceptable disposal method from both environmental and social perspectives. The broad management options for produced water include direct injection, environmentally acceptable direct-use of untreated water, or treatment to a standard defined by the U.S. Environmental Protection Agency (EPA) before disposal or supply to users.

Management of produced water can be problematic. For example, disposal through direct injection may not be feasible. Typically, large-scale on-site storage and/or disposal require significant investment costs towards large and expensive infrastructure. Trucking water off-site for disposal involves high transport costs. Therefore, cost efficient, on-site solutions to produced water disposal and management are sought.

Evaporation technologies are known in the art, but current designs have significant drawbacks. For example, produced water can be evaporated at small on-site evaporation ponds. While relatively low-cost, these ponds still create relatively large surface-area disturbance and they may also be attractive and/or harmful to wildlife. Also, water may be sprayed into the atmosphere through portable misting towers. But, misting can lead to salt damage to soil and vegetation. Evaporation may be achieved by introducing thermal elements into smaller volumes of water to speed evaporation. But, the resulting precipitates tend to create scaling, which adheres to heating elements over time, reduces efficiency, and creates maintenance issues. Therefore, efficient and environmentally safe solutions for the evaporative disposal of produced water are elusive.

SUMMARY OF THE INVENTION

In light of the problems and deficiencies inherent in the prior art, the present invention seeks to overcome these by providing a water evaporator including a tank with a combustion pipe and burner unit, wherein water is injected into the combustion pipe, flash evaporated, and gases are projected into the tank to drive evaporative and water treatment functions.

In accordance with the invention as embodied and broadly described herein, the present invention resides in a water treatment device comprising a vertical combustion chamber comprising a hollow elongate tubular member having a longitudinal axis disposed in a substantially downward direction, the tubular member having an interior surface and an exterior surface. The water treatment device further comprises a heat source coupled to the combustion chamber capable of directing heat downward through the hollow elongate member of the combustion chamber and at least one aperture disposed through a side of the elongate tubular member, wherein the aperture is disposed within the elongate tubular member at an angle ranging from approximately 40 to 89 degrees with respect to the diametric axis of the elongate tubular member. In one aspect, the invention also comprises a pump operatively coupled to the elongate tubular member and configured to direct fluids through the at least one aperture at a predetermined flow rate such that the fluids are directed about the interior of the tubular member in a spiraling manner forming a hollow center within the fluids as the fluids descend down the tubular member.

In accordance with another embodiment of the invention, a water treatment device is disclosed comprising a cylindrical vertical combustion chamber disposed in a substantially downward direction, the tubular member having an interior surface and an exterior surface. In addition a heat source is coupled to the combustion chamber capable of propagating heat downward through the hollow elongate member of the combustion chamber. A cylindrical horizontal mixing chamber is also provided, operatively coupled to the cylindrical vertical combustion chamber, the horizontal mixing chamber comprising a plurality of stationary mixing members capable of agitating fluid flowing through the horizontal mixing chamber. Additionally, means, operatively coupled to the vertical combustion chamber, are provided to direct fluids into the vertical combustion chamber at a predetermined flow rate such that the fluids are directed about the interior of the vertical combustion chamber to form a liquid vortex as the fluids descend down the vertical combustion chamber.

In accordance with another embodiment of the invention, a method for concentrating fluids is disclosed comprising directing a volume of fluid in a liquid state at a predetermined flow rate into an elongate tubular member in a manner that induces the water to spiral about an inner surface of the elongate tubular member creating a hollow space within the spiral of water. The method further comprises directing a unit of heat downward into the elongate tubular member and into the hollow space within the spiral of water, the unit of heat capable of converting at least a portion of the volume of fluid in a liquid state directed into the elongate tubular member at the predetermined flow rate into a gas and discharging the portion of the volume of fluid in a liquid state converted into a gas to the atmosphere.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings are not drawn to scale. The invention will be described and explained with additional specificity and detail through the use of the accompanying drawings in which.

DETAILED DESCRIPTION OF THE ILLUSTRATED EMBODIMENT

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention in its various embodiments, some of which are depicted in the figures herein, can be broadly described as a water evaporation mechanism or a water concentration mechanism. Broadly speaking, it resides in a liquid waste treatment device having a hollow elongate tubular member configured to received liquid waste therein. Apertures are disposed on a top side of the elongate tubular member at an angle which is designed to induce a spiraling effect or liquid vortex about the interior of the tubular member as liquid waste is injected in the slits and gravity draws the waste downward in the tubular member. A heating device is disposed atop the tubular member and produces heat sufficient to evaporate a portion of the liquid waste (e.g., waste water). While waste water is specifically referenced herein, one of ordinary skill in the art will recognize that any fluid that is susceptible to concentration via evaporation may be used in connection with the present invention.

The spiraling or vortex effect that is created by pumping fluids through the apertures disclosed herein advantageously creates a mechanism that increases the amount of time any particular discrete volume of waste water is subjected to evaporative heat within the same length of pipe or tubing. This allows for a more compact and economical design. Additionally, the spiraling or vortex effect reduces the likelihood of scale formation because of a "scrubbing" effect about the sides of the pipe or tubing. That is, the velocity of the waste water within the tube is such that the formation of precipitation on the interior of the pipe is minimized.

Figure 1:
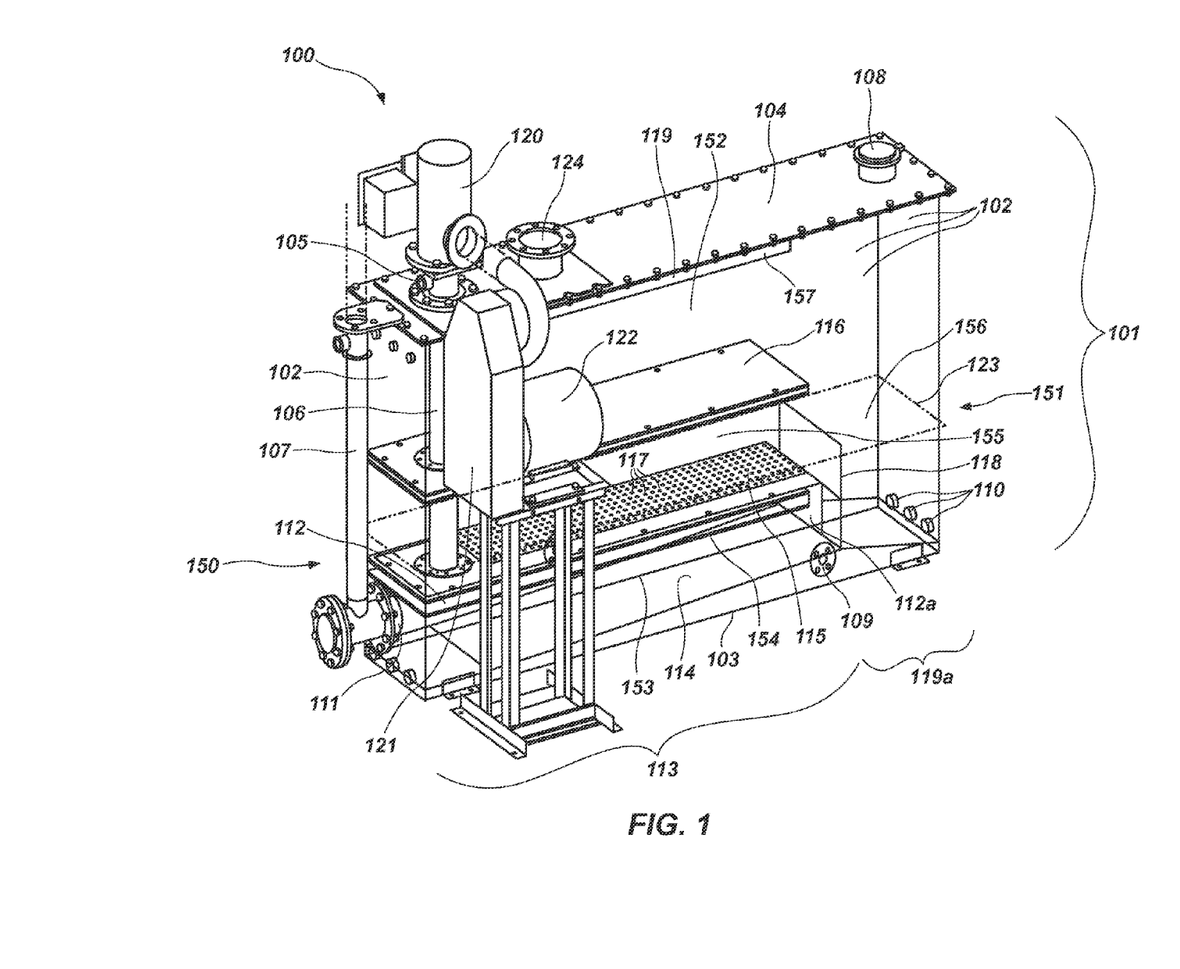
FIG. 1 is a perspective view of an evaporator in accordance with one embodiment of the present invention.

Referring now to FIG. 1, a perspective view of one embodiment of an evaporator 100 is shown. Various embodiments of the evaporator 100 are of different configurations. However, the illustrated embodiment of the evaporator 100 is comprised of a tank 101 with four sides 102, a bottom 103, and a removable top 104. In the illustrated embodiment, the tank 101 is of a substantially elongated rectangular shape with an overall internal tank volume 152. Moreover, in the illustrated embodiment, the tank 101 has a first end 150 and a second end 151.

Tank 101 has a water supply inlet 105 for introducing untreated water into the evaporator 100, and more particularly, into the tank 101. In the illustrated embodiment, the water supply inlet 105 is in communication with and connects adjacent to the top of a combustion pipe 106 that extends from the outside of the tank 101, downwards into the tank 101 through interior volume 152. In the illustrated embodiment, the combustion pipe is located adjacent to first end 150 and the tank top 104. When the evaporator 100 is in use, untreated water enters the water supply inlet 105 and is conveyed downwards into a hollow elongate tubular member (or combustion pipe or combustion chamber) 106, through specialized dynamics which prevent scaling as described below. While a pipe is shown as an example of one embodiment of the invention, it is understood that other members configured to act as a vertical combustion apparatus are contemplated for use herein without departing from the spirit of the invention so long as the spiraling effect or liquid vortex is formed.

Any number of additional features may be added to the exterior of the tank 101 without departing from the purpose and scope of the invention. For example, various embodiments may have one or more view ports 108 to allow a user to observe and/or monitor the interior of the tank 101. One or more view ports may be located in the top 104 and adjacent to second end 151, or in other locations along the tank. The tank 101 may also include one or more apertures 109, 110 for the release of material from the tank. Finally, the tank 101 may include one or more exhaust recycling apertures 111 for introduction of combustion exhaust from an external power generation source into the tank 101, as described below.

The tank 101 contains a plurality of interior plates and other features that form various partially open sub-volumes or compartments within the tank 101 that perform a variety of functions in connection with operation and functions of the evaporator 100. First, the tank 101 has a primary diffusion plate 112 within overall interior volume 152. The primary diffusion plate 112 is located above the bottom 103 of the tank 101. Primary diffusion plate 112 may extend from first end 150 along a substantial interior length 113 of the tank 101 within volume 152, thereby forming the top of a sub-volume 153. Sub-volume 153 is a volume above and adjacent to the tank bottom 103. Primary diffusion plate 112 has at its end opposite first end 150, a ninety degree turn that forms a partial end 112a to sub-volume 153. In certain embodiments, a first angled shelf 114 may form a bottom surface between sub-volume 153 and bottom 103.

Second, a secondary diffusion plate 115 is located above the primary diffusion plate 112. Secondary diffusion plate 115 also extends from first end 150 along a substantial interior length 113 of the tank 101 within volume 152 and forms a top to sub-volume 154. Sub-volume 154 is a volume above and immediately adjacent to sub-volume 153. In various embodiments of the invention, primary 112 and/or secondary 115 diffusion plates are permeable and/or semi-permeable to allow fluid communication between sub-volumes 153, 154, and 155. Such communication may be through a plurality of apertures 117 or otherwise.

Third, the tank 101 includes a first barrier plate 116 located above the secondary diffusion plate 115. The barrier plate 116 extends from first end 150 along a substantial interior length 113 of the tank 101 within overall volume 152 and forms the top of sub-volume 155, a volume above and adjacent to sub-volume 154. In preferred embodiments, barrier plate 116 is substantially solid so as to obstruct fluid communication.

Fourth, the tank 101 includes second barrier plate 118, located along lesser interior length 119a adjacent to the second end 151 and tank bottom 103. The second barrier plate 118 is perpendicularly oriented to the tank bottom 103 and forms sub-volume 156 in the tank 101 adjacent to second end 151.

Fifth, the tank includes a mist eliminator and exit compartment 119 that forms an interior tunnel adjacent and/or connected to the top 104 of the tank 101, and having a volume 157, and first and second open ends, the second end in communication with exhaust aperture 124 for water vapor exit.

When the evaporator 100 is in operation, sub-volumes 153, 154, 156 and a portion of sub-volume 155 are occupied by treated water to the elevation of a water line 123.

The evaporator 100 is further comprised of a burner unit 120 located adjacent to the top 104 of the tank 101 at first end 150. The burner unit 120 is connected to and in communication with the top of the combustion pipe 106. In various embodiments, the burner unit 120 is connected to the combustion pipe 106 by way of a combustion pipe manifold 200 (see FIG. 2) which incorporates the water supply inlet 105. When the evaporator 100 is in use, the burner unit 120 is operable to project a flame downwards within the combustion pipe 106.

Evaporator 100 also has a combustion blower 121 in communication with the burner unit 120 and capable of providing forced air to the burner unit 120 for purposes of combustion, and to facilitate projection of a flame from the burner unit 120 downwards into the combustion pipe 106 when the burner unit 120 is in operation. In one embodiment of the invention, the combustion air directed into the combustion pipe 106 ranges from between 1800 to 3400 degrees Fahrenheit. The combustion blower is powered by a motor 122. In various units, the burner unit 120 is in communication with an exhaust recycling pipe 107 that is capable of delivering exhaust from an external power generation exhaust source into sub-volume 153 of the tank 101 to further enhance the evaporation mechanisms of the evaporator 100, as described below. Pipe 106 may comprise stainless steel or even schedule 80 PVC pipe despite the high temperatures emanating from burner unit 120 due to the dissipation of heat resulting from the evaporation process.

Figure 2:
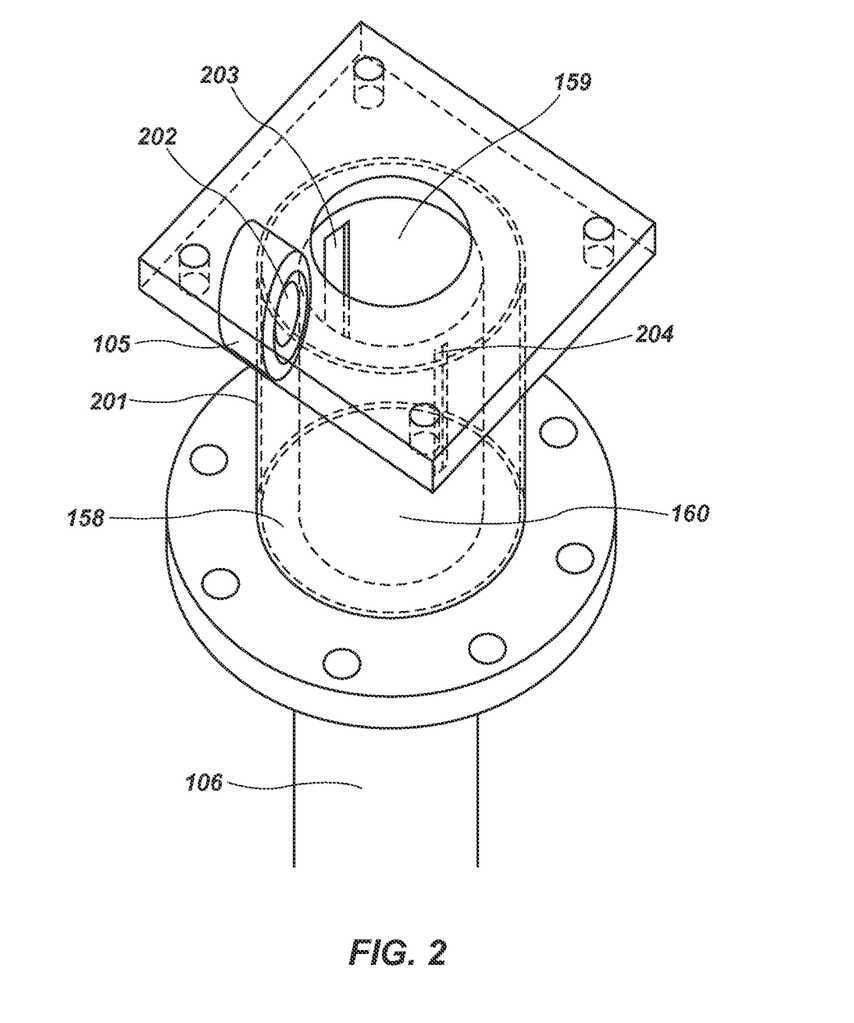
FIG. 2 is perspective view of one embodiment of a combustion manifold and pipe of one embodiment of the present invention.
Figure 3:
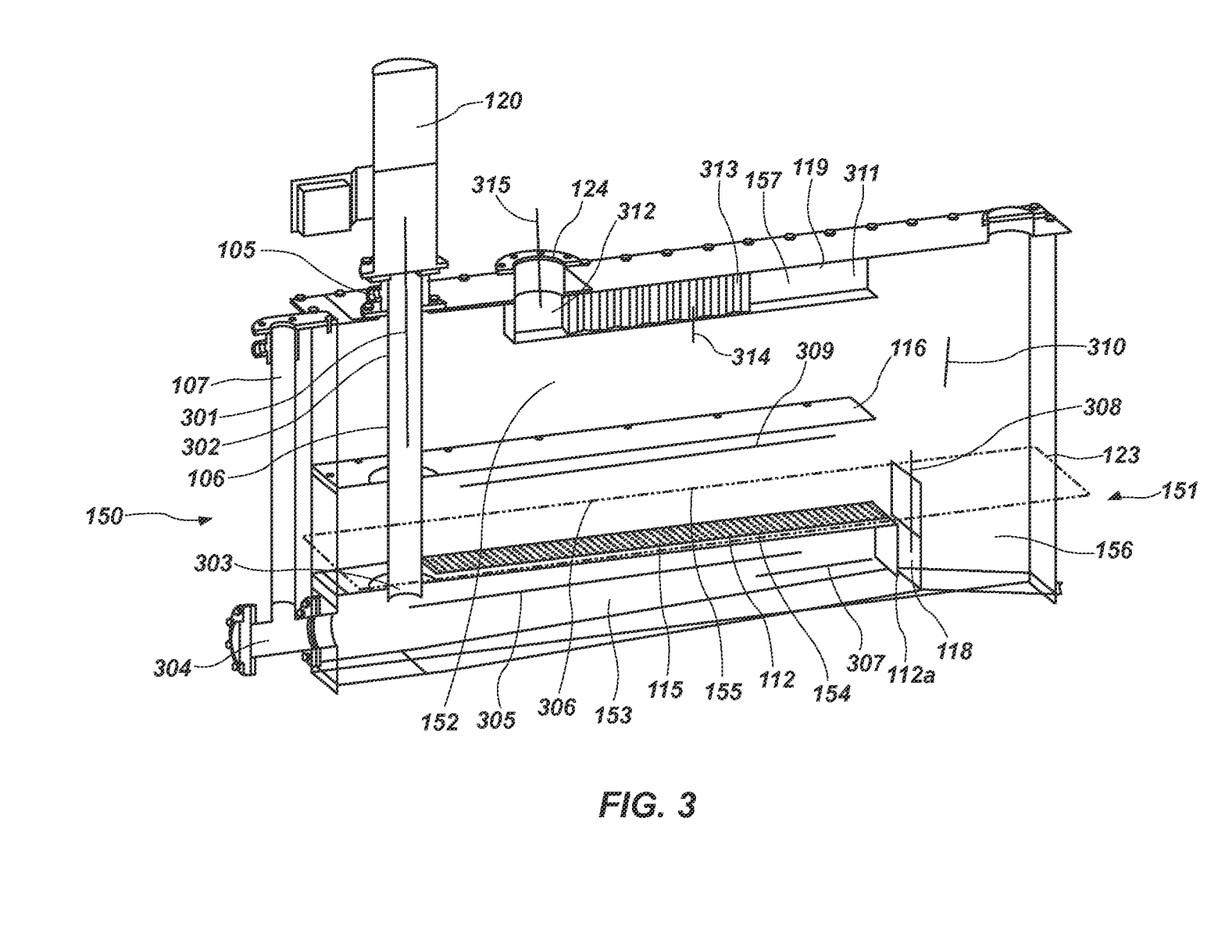
FIG. 3 is a cross-section of the embodiment shown in FIG. 1.
Figure 4:
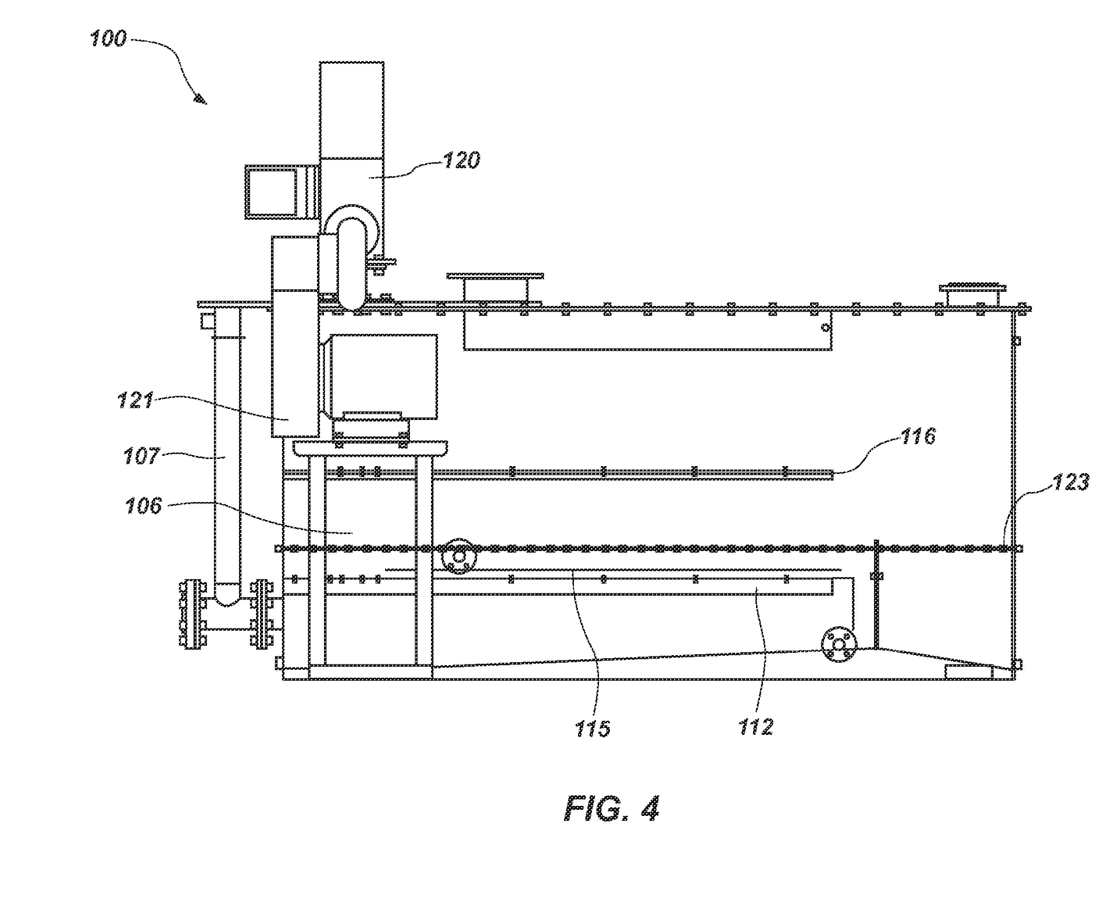
FIG. 4 is an additional side view in accordance with one embodiment of the present invention.
Figure 5:
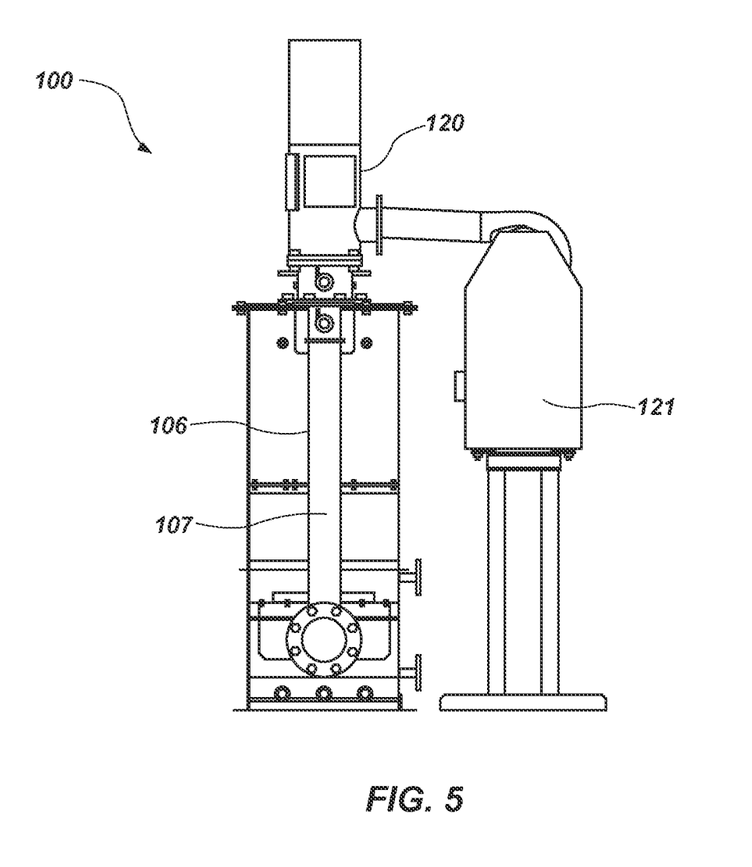
FIG. 5 is an end in accordance with one embodiment of the present invention.
Figure 6:
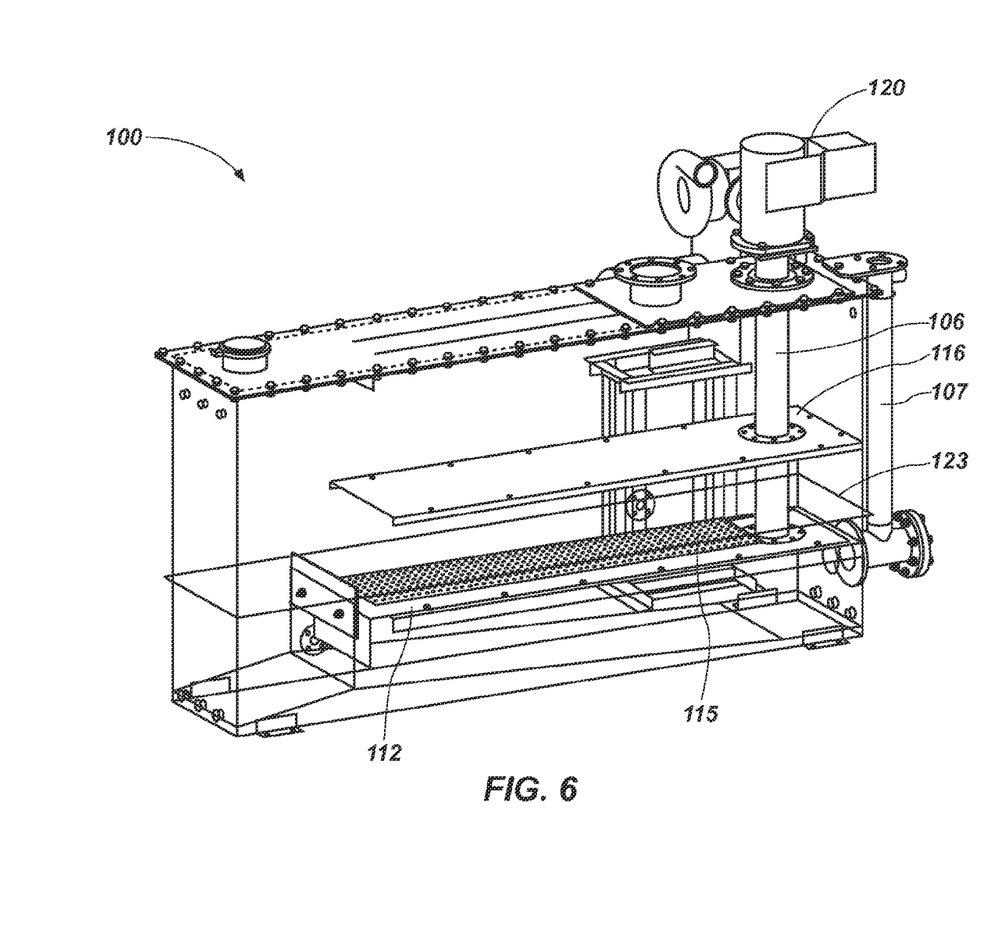
FIG. 6 is a perspective view of one embodiment of the present invention.
Figure 9:
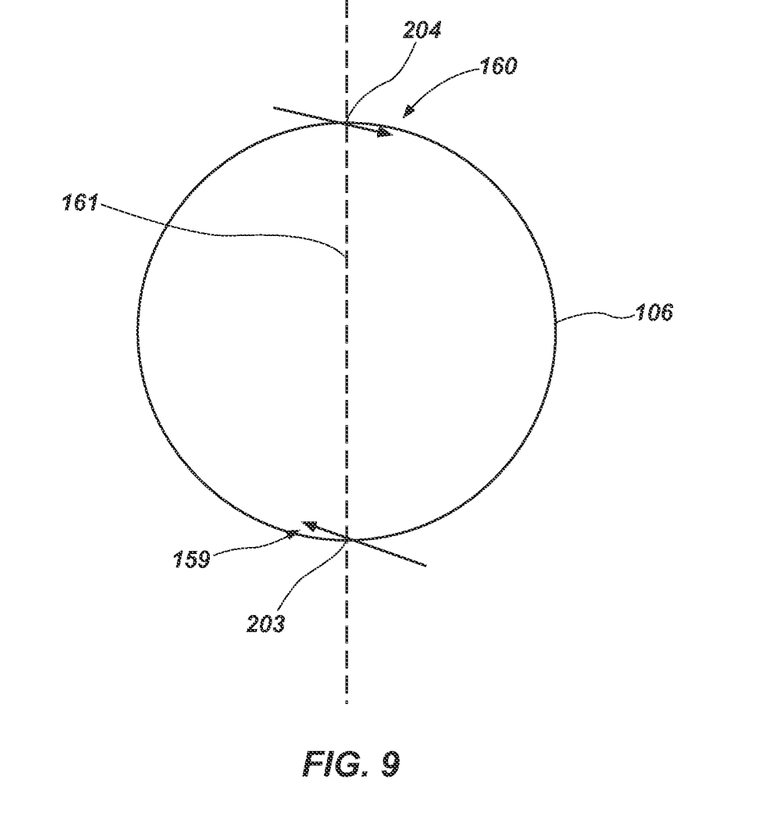
FIG. 9 is a top cross-sectional view of a vertical combustion chamber in accordance with one embodiment of the present invention.

Referring now to FIGS. 2 and 9, the combustion pipe manifold 201 is shown together with the combustion pipe 106. The manifold 201 surrounds an area of the combustion pipe 106 adjacent to the top of the pipe to create a volume 158 between the manifold 201 and the combustion pipe 106. The manifold 201 is in communication with the water supply inlet 105 through a manifold aperture 202 which allows untreated water to be delivered into volume 158.

Combustion pipe 106 contains one or more apertures 203, 204 which are configured to allow untreated water from volume 158 into the combustion pipe 106. In various embodiments, the sides of the apertures are beveled or angled such that pressurized water entering through them is projected onto the sides of the combustion pipe 106, such that the water travels in a spiral direction, coating the pipe 106 as it travels downwards through the pipe. For example, in the illustrated embodiment, the pipe 106 has two elongated, rectangular, and/or angled apertures or slits 203, 204 on opposite sides of the pipe. A first aperture 203 is angled to project water in direction 159 along the interior surface of the pipe 106. A second aperture 204 is angled to project water in direction 160 along the interior surface of the pipe 106. In one aspect of the invention, the direction of water projected along the interior surface of the pipe from the first aperture 203 is opposite the direction of the water projected along the interior surface of the pipe from the second aperture 204 with the apertures on opposing sides of the pipe 106. However, it is understood and contemplated herein that the apertures may be disposed near one another with the direction of projected fluid in similar directions. Alternatively, the apertures may be staggered about the pipe 106 at different locations about the perimeter of the pipe 106 and at different elevations. For example, in one aspect of the invention, two apertures may be disposed one substantially on top of the other and substantially aligned with respect to a longitudinal axis of the pipe 106. In another aspect, two or more apertures may be disposed atop one another but not aligned with respect to a longitudinal axis of the pipe 106. In sum, numerous configurations and placement of one or numerous apertures is contemplated herein without departing from the spirit or scope of the invention.

In accordance with one embodiment of the invention, the slits are disposed at an angle that is substantially tangent to an inner surface of pipe 106. This enables water to be directed about the inner surface of pipe 106 in a circular fashion. Depending on the flow rate at which water is directed through the aperture, the size of the aperture, and the inner diameter of pipe 106, the thickness of the fluid flow about the inner diameter of pipe 106 may be controlled as well as the rate at which the fluid spirals down through pipe 106 in response to gravitational forces.

In accordance with one embodiment of the invention, the apertures 203, 204 may comprise a circular hole having a diameter of one-eighth inches disposed through a sidewall of pipe 106. In another embodiment, it may comprise a rectangular slit approximately one-eighth inch wide by four inches long. In one embodiment of the invention, the slits or apertures are disposed through a sidewall of pipe 106 at an angle ranging from between 40 and 89 degrees relative to a diametric axis 161 of pipe 106. In this embodiment, the aperture is disposed substantially perpendicular to a longitudinal axis of pipe 106. The momentum generated from the fluids directed along the inner surface of the pipe 106 substantially perpendicular to a longitudinal axis of 106 induces the fluids to circle about the interior of the pipe. Gravity draws the water downward through pipe 106 creating spiraling affect of liquid vortex. In another embodiment, the aperture may also be disposed at downward angle such that momentum induces water about the inner diameter of the pipe in a circular fashion but also down the pipe 106.

In one embodiment of the invention, an inner diameter of pipe 106 is sized to be approximately one half inch larger than an inner diameter of burner unit 120. Burner unit 120 is sized to have an inner diameter ranging from approximately three to eight inches. Accordingly, an inner diameter of the pipe 106 is sized to be approximately three and a half to 8 and a half inches. Other diameter pipes may be used as suits a particular application and the inner diameter of pipe 106 may be sized approximately the same as burner unit 120 without departing from the scope of the invention. In one aspect of the invention, the pressure at which water is directed through the apertures or slits 203, 204 ranges from between 24 to 48 inches of water and is directed through the apertures at flow rates ranging from between 20 and 100 gallons per minute.

While opposing apertures or slits are shown in the attendant figures, it is understood that a single aperture or slit could be used, or an aperture having any number of configurations and still remain within the scope and spirit of the invention. Moreover, it is understood that other means may be used to induce the fluid vortex or spiraling motion. For example, a nozzle may be disposed within an inner portion of pipe 106 that directs water at an appropriate angle with respect to the inner surface of pipe 106 to induce the desired spiraling affect.

When the evaporator 100 is in operation, the one or more apertures 203, 204 project water in a spiraling fashion, and as a flame is projected downwards into the combustion pipe 106, this water is flash evaporated, exiting the combustion pipe 106 as steam. Significantly, water constituents and material that would create scaling in other applications of thermal evaporation is simply precipitated and forced out of the combustion pipe 106 in the current invention, thereby reducing and/or eliminating the scaling problem.

Referring generally to FIGS. 3 through 6, the overall structure and function of the evaporator 100 is further explained through a cross section of the evaporator 100. Untreated water, such as produced water, for example, enters the evaporator 100 through the water supply inlet 105, and is projected 301 downwards into the combustion pipe 106 along the interior surfaces of the pipe. The burner unit 120 simultaneously projects 302 a flame downwards, assisted by the blower, downwards into the combustion pipe, thereby flash evaporating the water within the pipe 106 and expelling 303 water and precipitate downwards into lower volume 153 of the tank. As referenced above, volumes 153, 154, 156, and portions of volume 155 are occupied by water and/or brine, by way of example, to water line 123. Exhaust from an external power generation exhaust source, such as, for example, an external generator, is recycled through the exhaust recycling pipe 107 and is also redirected 304 into the tank 101 into lower volume 153.

Heated gases, vapor, and/or precipitate resulting from the above processes are roiled 305 through water and or brine in sub-volume 153 towards second end 151. Some amount or amounts of the gases and/or vapor dissipate 306 through the primary 112 and/or secondary 115 diffusion plates, moving from sub-volume 153 into sub-volumes 154 and/or 155. Other amounts are partially blocked by the primary 112 and/or secondary 115 diffusion plates, and continue to travel toward the partial end 112a and/or second barrier plate 118, where they are either returned 307 into sub-volume 153 to continue churning or, they are expelled upward 308 into upper reaches of tank 101.

Those gases and/or vapors that are dissipated through the primary 112 and/or secondary 115 diffusion plates continue to rise upward until they are blocked by the primary barrier plate 116 and redirected 309 towards second end 151. The net effect of the structure of the evaporator and its collective dynamics is to produce an efficient, churning evaporation engine within the lower portions of the tank 101, which creates fluid energy generally from first end 150 to second end 151 in the tank 101, and higher pressure than exists outside of the tank 101. Precipitates and other impurities, many of which would tend to cause scaling in other technologies, are either left behind in the concentrated water and/or brine solution that results from the processes of the evaporator 100, or they float to the top of the water and/or brine solution and are forced by the general transfer of fluid energy into sub-volume 156, where they are retained by the second barrier plate 118 for later removal. Sub-volume 156 thereby forms a solid catch feature of the evaporator 100.

Because exhaust aperture 124 provides access to lower pressures outside of the tank, evaporated water rises 310 from the lower portions of the tank towards second end 151, where it is collected into the mist eliminator and exit compartment 119 that forms an interior tunnel adjacent and/or connected to the top 104 of the tank 101, and having a volume 157, and first 311 and second 312 open end, the second end 312 in communication with exhaust aperture 124 for water vapor exit. Evaporated water travels through the mist eliminator and exit compartment 119. One or more mist eliminators may be located within volume 157 to eliminate mist from evaporated water. Mist is precipitated 314 down into the tank 101. Evaporated water that is not precipitated as mist exits 315 the tank 101 through exhaust aperture 124 as steam.

Figure 7:
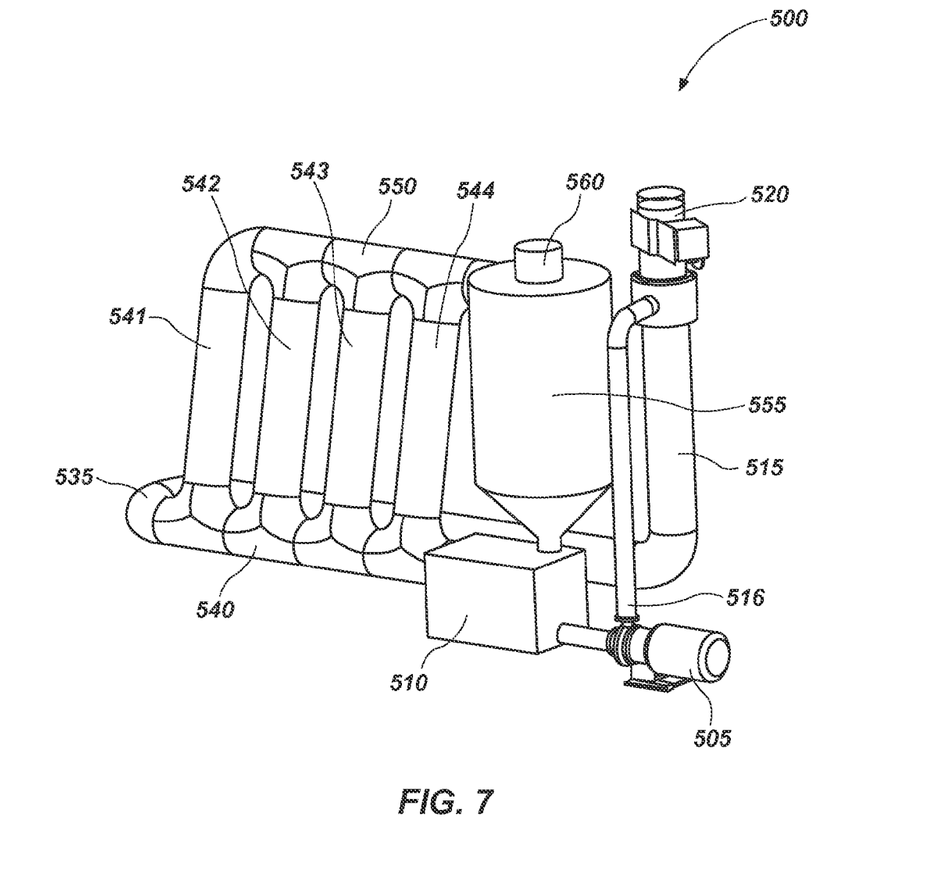
FIG. 7 is a perspective view of one embodiment of the present invention.
Figure 8:
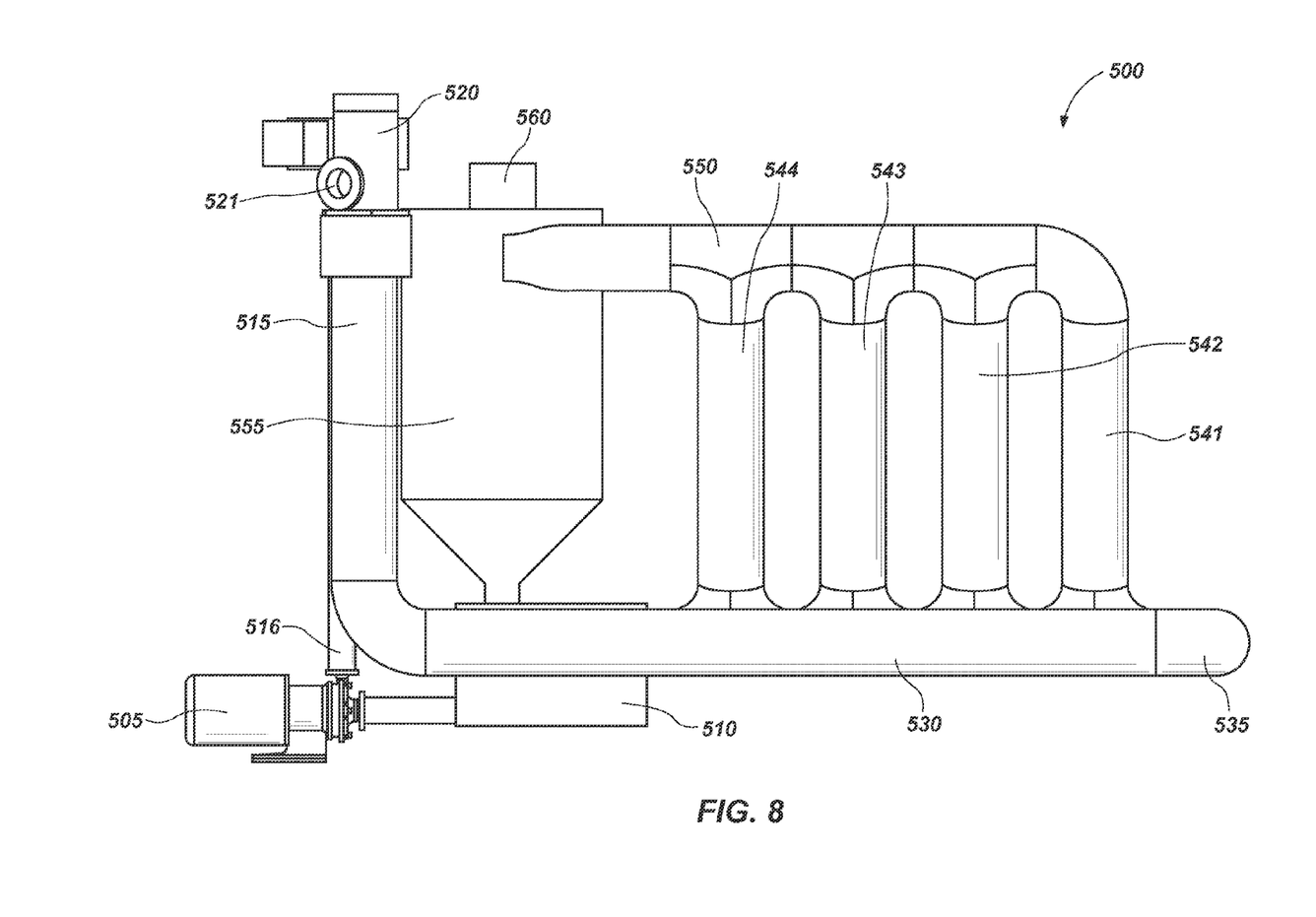
FIG. 8 is a side view of the embodiment shown in FIG. 6.

Referring now to FIGS. 7 and 8, in accordance with another embodiment of the present invention, a water treatment device 500 configured to evaporate water from a waste stream is disclosed. The water treatment device comprises a pump 505 operatively connected to a fluid reservoir 510. Pump 505 is also operatively connected to an elongate tubular member or pipe 515 by way of vertical pipe 516. According to one embodiment, the pump 505 is configured to direct waste water to the top of the elongate tubular member or pipe 515 in such a manner that water spirals about an inner surface of the pipe. In one aspect of the invention, this is achieved by injecting water through apertures or slits disposed in the sidewall of pipe 515 which installed substantially tangent to an inner surface of the pipe 515. In one aspect the angles at which the apertures or slits are disposed ranges from approximately 40 to 89 degrees with respect to a diametric axis of the pipe 515. In this embodiment, the apertures or slits are substantially perpendicular to a longitudinal axis of the pipe 515 allowing gravity to draw water down the pipe. However, in another embodiment, the apertures may also be disposed at a downward angle (e.g., 1 to 45 degrees) relative to a plane perpendicular to a longitudinal axis of pipe 515. Advantageously, the spiraling affect of the water about the interior of pipe 515 creates an open hole or space whereby heat may be directed to evaporate water from the waste water stream. The thickness and velocity of the water spiraling down the pipe 515 may be controlled in such a manner that precipitate is not formed on the inner surface of the pipe 515. Rather, the waste water is converted to steam and removed from the waste stream.

A burner unit 520 is mounted on top of pipe 515 capable of and configured to direct heat (e.g., a flame) down through pipe 515 and through the center of the spiraling waste stream. The burner unit 520 is powered by an air combustion blower which also assists in directing or propagating the flame of the burner unit 520 downward through pipe 515. The combustion blower is coupled to the burner unit 520 at inlet 521. Pipe 515 is in fluid communication with a horizontal tubular mixing chamber 530. Fluids that are evaporated within the combustion chamber 515 are directed into the horizontal mixing chamber 530 in a gas/liquid mixture together with the liquid that has not been evaporated. A plurality of stationary mixing mechanisms are disposed throughout the horizontal mixing chamber 530 in order to agitate the gas/liquid mixture. The agitation of the gas/liquid mixture distributes the heat energy from the burner unit 520 throughout the mixture in an effort to minimize the heat difference between the liquid and gas in the mixture. In one aspect of the invention, the pump 505 is also in fluid communication with the horizontal mixing chamber 530. A valve is used to control the flow of fluids and a nozzle disposed in the region where the vertical combustion chamber 515 transitions to the horizontal mixing chamber 530. The valve and nozzle direct fluids to the rear of the chamber 530 in an effort to keep the surfaces of the horizontal mixing chamber 530 wetted.

In one embodiment of the invention, a one-hundred eighty degree pipe fitting 535 connects the horizontal mixing chamber 530 to a lower separator tube 540. The separator tube 540 is in fluid communication with a plurality of separator columns 541, 542, 543, and 544 and also to the fluid reservoir 510. As fluids flow horizontally through the lower separator tube 540, the less dense gaseous component of the liquid/gas mixture rise through the separator columns 541, 542, 543, 544 and travel along an upper separator tube 550 into a cyclone separator 555. The cyclone separator is located atop the fluid reservoir 510. A mist eliminator 560 and exhaust stack (not shown) are disposed at the cyclone separate 555 and all act in concert to eliminate liquid waste entrained in the gaseous volume of fluid that moves up through the separator columns 541, 542, 543, 544. Waste gas thereafter escapes the system through an exhaust stack (not shown). Concentrated waste fluid is held in fluid reservoir 510 where it can be sent through the waste treatment system 500 again or disposed of.

In another embodiment of the present invention, the water treatment device 500 may be used as a device for efficiently heating liquids before they are used in connection with oil and gas exploration (i.e., drilling) operations. In certain applications, it may be desirous for clean fluids to be heated prior to be use in oil and gas exploration. In one aspect of the invention, fluids are directed into the vertical combustion chamber 515 in much the same way the waste fluids are directed into and processed by the vertical combustion chamber 515. That is, the fluids are directed into the vertical combustion chamber in such a way that they are circulated about the interior surface in a spiraling manner and heated by energy from the burner unit 520 directed downward through the center of the spiraling fluids. The level of heat is controlled such that a substantial portion of the fluids are not evaporated. Rather, they are heated to temperatures suitable for use in connection with drilling applications.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions described in connection with the embodiments disclosed may be changed as would be apparent to those skilled in the art.

It will be understood by those having skill in the art that many changes may be made to the details of the above-described embodiments without departing from the underlying principles of the invention. The scope of the present invention should, therefore, be determined only by the following claims.

The invention claimed is:

1. A water treatment device, comprising:
 a. a vertical combustion chamber comprising a hollow elongate tubular member having a longitudinal axis disposed in a substantially downward direction, the tubular member having an interior surface, an exterior surface, and a substantially continuous diameter from a top of the elongate tubular member to a bottom of the elongate tubular member;
 b. a heat source coupled to the combustion chamber capable of directing heat downward through the hollow elongate member of the combustion chamber, wherein the heat source comprises a hollow member having an inner diameter that is smaller than an inner diameter of the hollow tubular member of the combustion chamber;
 c. at least one aperture disposed through a side of the elongate tubular member, wherein the aperture is disposed within the elongate tubular member at an angle ranging from approximately 40 to 89 degrees with respect to a diametric axis of the elongate tubular member;
 d. a pump operatively coupled to the elongate tubular member and configured to direct waste fluids through the at least one aperture at a predetermined flow rate such that the waste fluids are directed about the interior of the tubular member in a spiraling manner forming a hollow center within the waste fluids as the waste fluids descend down the tubular member, said pump being the sole source of waste fluids into the combustion chamber.

2. The water treatment device of claim 1, wherein the at least one aperture comprises a slit formed substantially parallel to the longitudinal axis of the tubular member and near the top of the elongate tubular member.

3. The water treatment device of claim 2, further comprising a plurality of slits disposed about a circumference of the tubular member.

4. The water treatment device of claim 1, wherein the pump directs waste fluids through the at least one aperture in such a manner that the thickness of the waste fluids directed about the interior of the elongate tubular member in a spiraling manner approximates the difference in the thickness between the inner diameter of the hollow member of the heat source and the inner diameter of the hollow tubular member of the combustion chamber.

5. The water treatment device of claim 1, wherein the heat source comprises a gas burner disposed atop the hollow elongate tubular member of the combustion chamber, the gas burner being capable of propagating a flame downward into the hollow elongate tubular member of the combustion chamber.

6. The water treatment device of claim 1, further comprising a horizontal mixing chamber comprising a hollow elongate tubular member operatively coupled to the hollow elongate tubular member of the vertical combustion chamber.

7. The water treatment device of claim 6, wherein the pump is operatively connected to the horizontal mixing chamber at a point where the elongate tubular member of the horizontal mixing chamber connects to the elongate tubular member of the vertical combustion chamber.

8. The water treatment device of claim 6, further comprising a plurality of air separator columns operatively coupled to the horizontal mixing chamber and disposed substantially non-parallel to the elongate tubular member of the vertical combustion chamber.

9. A water treatment device, comprising:
 a. a cylindrical vertical combustion chamber disposed in a substantially downward direction, a tubular member having an interior surface and an exterior surface;
 b. a heat source coupled to the vertical combustion chamber capable of propagating heat downward through a hollow elongate member of the vertical combustion chamber;

c. a cylindrical horizontal mixing chamber operatively coupled to the cylindrical vertical combustion chamber, the horizontal mixing chamber comprising a plurality of stationary mixing members capable of agitating fluid flowing through the horizontal mixing chamber;

d. a means operatively coupled to the vertical combustion chamber, the means functioning to direct fluids into the vertical combustion chamber at a predetermined flow rate such that the fluids are directed about the interior of the vertical combustion chamber to form a vortex as the fluids descend down the vertical combustion chamber, wherein a thickness of the fluids about the interior of the vertical combustion chamber is substantially equivalent to a difference between an inner diameter of the vertical combustion chamber and an inner diameter of the heat source.

10. The water treatment device of claim 9, wherein the heat source comprises a gas burner operatively coupled to the vertical combustion chamber, wherein the gas burner is capable of propagating a flame downward into the vertical combustion chamber and into a hollow center of the vortex.

11. The water treatment device of claim 10, further comprising a combustion air blower operatively coupled to the burner, the combustion air blower configured to regulate the size of the flame directed into the vertical combustion chamber.

12. The water treatment device of claim 9, further comprising:
   a. at least one separator column operatively coupled to the horizontal mixing chamber;
   b. at least one cyclone separator operatively coupled to the at least one separator column;
   c. an exhaust stack disposed atop the cyclone separator; and
   d. a reservoir operatively coupled to the separator column and the cyclone separator.

13. The water treatment device of claim 9, further comprising diametrically opposed apertures disposed within a top portion of the vertical combustion chamber, the apertures being operatively coupled to a pump and disposed within the vertical combustion chamber substantially tangential to an inner surface of the vertical combustion chamber.

14. The water treatment device of claim 9, wherein the means functioning to direct fluids into the vertical combustion chamber comprises at least one slit disposed through a sidewall of the cylindrical vertical combustion chamber, the slit being disposed at a downward angle.

15. A water treatment device, comprising:
   a vertical combustion chamber comprising a hollow elongate tubular member having a longitudinal axis disposed in a substantially downward direction, the tubular member having an interior surface;
   a heat source coupled to the combustion chamber, the heat source being capable of directing heat downward through the hollow elongate member of the combustion chamber, the heat source comprising an internal diameter that is less than an internal diameter of the vertical combustion chamber;
   at least one aperture disposed through a side of the elongate tubular member of the vertical combustion chamber;
   a pump operatively coupled to the elongate tubular member of the vertical combustion chamber, the pump being configured to direct liquid through the at least one aperture at a predetermined flow rate such that the liquid is directed about the interior of the tubular member in a spiraling manner forming a hollow center within the liquid as the liquid descends down the tubular member; and
   the liquid having a thickness that approximates the difference in the thickness between the inner diameter of the heat source and the inner diameter of the elongate tubular member of the combustion chamber.

16. The water treatment device of claim 15, comprising a ninety degree interface between an internal surface of the elongate tubular member of the vertical combustion chamber and an internal surface of the heat source.

17. The water treatment device of claim 15, wherein the at least one aperture comprises diametrically opposed apertures disposed within a top portion of the vertical combustion chamber, the apertures being operatively coupled to a pump and disposed within the vertical combustion chamber substantially tangential to an inner surface of the vertical combustion chamber.

18. The water treatment device of claim 17, wherein the apertures are disposed at a downward angle.

* * * * *